(12) United States Patent
Gunnarsson et al.

(10) Patent No.: US 9,668,187 B2
(45) Date of Patent: May 30, 2017

(54) NETWORK NODE AND METHOD IN A NETWORK NODE

(75) Inventors: Fredrik Gunnarsson, Linköping (SE); Mats Folke, Luleå (SE); Walter Müller, Upplands Väsby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 177 days.

(21) Appl. No.: 14/366,288

(22) PCT Filed: Dec. 19, 2011

(86) PCT No.: PCT/SE2011/051539
§ 371 (c)(1),
(2), (4) Date: Jun. 18, 2014

(87) PCT Pub. No.: WO2013/095216
PCT Pub. Date: Jun. 27, 2013

(65) Prior Publication Data
US 2014/0328326 A1 Nov. 6, 2014

(51) Int. Cl.
*H04W 4/00* (2009.01)
*H04W 36/24* (2009.01)
*H04W 36/00* (2009.01)
*H04W 36/04* (2009.01)

(52) U.S. Cl.
CPC ....... *H04W 36/24* (2013.01); *H04W 36/0083* (2013.01); *H04W 36/04* (2013.01)

(58) Field of Classification Search
None
See application file for complete search history.

(56) References Cited

U.S. PATENT DOCUMENTS

| | | | |
|---|---|---|---|
| 6,446,132 B1 | 9/2002 | Kikuchi | |
| 2005/0090262 A1* | 4/2005 | Hamano | H04W 36/0011 455/445 |

(Continued)

FOREIGN PATENT DOCUMENTS

| | | |
|---|---|---|
| EP | 1 533 948 | 5/2005 |
| EP | 1 679 921 | 7/2006 |

(Continued)

OTHER PUBLICATIONS

International Search Report for International Application No. PCT/SE2011/051539, Aug. 23, 2012.

(Continued)

*Primary Examiner* — Minh-Trang Nguyen
(74) *Attorney, Agent, or Firm* — Baker Botts, LLP

(57) ABSTRACT

Network node (120) and method (300) in a network node (120), which is serving a user equipment (110), for instructing the user equipment (110) to send a measurement report in a wireless communication network (100) comprising the network node (120) and an underlay network node (130). The method (300) comprises estimating (302) an amount of data the user equipment (110) is expected to communicate. Further, the method (300) also comprises determining (303) the user equipment (110) to be a candidate for hand over to the underlay network node (130), based on the estimated (302) amount of data. Additionally, the method (300) comprises instructing (305) the user equipment (110) to send a measurement report.

21 Claims, 5 Drawing Sheets

(56) References Cited

U.S. PATENT DOCUMENTS

| | | | | |
|---|---|---|---|---|
| 2008/0242301 A1* | 10/2008 | Osterling | ............ | H04W 36/08 455/436 |
| 2010/0130208 A1* | 5/2010 | Hayashi | ............ | H04W 36/02 455/436 |
| 2011/0269494 A1* | 11/2011 | Kobayashi | ............ | H04W 36/30 455/509 |
| 2012/0008524 A1* | 1/2012 | Amirijoo | ............ | H04W 24/10 370/252 |
| 2012/0021788 A1* | 1/2012 | Yavuz | ............ | H04W 36/30 455/501 |
| 2012/0275391 A1* | 11/2012 | Cui | ............ | H04W 72/1247 370/329 |
| 2014/0362757 A1* | 12/2014 | Chang | ............ | H04W 76/002 370/312 |

FOREIGN PATENT DOCUMENTS

| | | |
|---|---|---|
| JP | 2007-159054 | 6/2007 |
| JP | 2010-219970 | 9/2010 |
| JP | 2011-130260 | 6/2011 |
| JP | 2011-239284 | 11/2011 |
| WO | WO 2004/023741 | 3/2004 |

OTHER PUBLICATIONS

International Search Report for International Application No. PCT/SE2011/051538, Aug. 23, 2012.

3GPP TSG-RAN WG2 Meeting #68; Jeju, Korea; Change Request (R2-096447), Nov. 9-13, 2009.

Annex A (informative) of "Use Cases related to Self Organising Network. Overall Description." Source: NGMN Project 12; Title: Informative List of SON Use Cases, Apr. 17, 2007.

TSG-RAN WG1; Sorrento, Italy; Source: Ericsson; Title: Power Control for PRACH; Agenda Item: 6.3.2 (R1-080879), Feb. 11-15, 2008.

3GPP TS 36.300 V8.2.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), Sep. 2007.

3GPP TR 36.902 V9.2.0; 3rd Generation Partnership Project; Technical Specification Group Radio Access Network; Evolved Universal Terrestrial Radio Access Network (E-UTRAN); Self-configuring and self-optimizing network (SON) use cases and solutions (Release 9), Jun. 2010.

3GPP TS 36.321 V9.3.0; 3rd Generation Partnership Project; Technical Specification Group Radio Access Network; Evolved Universal Terrestrial Radio Access (E-UTRA); Medium Access Control (MAC) protocol specification (Release 9), Jun. 2010.

3GPP TS 36.331 V9.3.0; 3rd Generation Partnership Project; Technical Specification Group Radio Access Network; Evolved Universal Terrestrial Radio Access (E-UTRA); Radio Resource Control (RRC); Protocol specification (Release 9), Jun. 2010.

JP Office Action issued for Application No. 2014-548724 (English translation included), Sep. 11, 2015.

* cited by examiner

NETWORK NODE AND METHOD IN A NETWORK NODE

PRIORITY

This nonprovisional application is a U.S. National Stage Filing under 35 U.S.C §371 of International Patent Application Serial No. PCT/SE2011/051539, filed Dec. 19, 2011 and entitled "Network Node and Method in A Network Node."

TECHNICAL FIELD

Implementations described herein relate generally to a network node, a method in a network node. In particular is herein described measurement report configuration of the user equipment with respect to an underlay network node.

BACKGROUND

User equipment (UE), also known as mobile stations, wireless terminals and/or mobile terminals are enabled to communicate wirelessly in a wireless communication system, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be portable and enabled to communicate voice and/or data, via the radio access network, with another entity, such as a network node, for example.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units.

The 3rd Generation Partnership Project (3GPP) has undertaken to evolve further the UTRAN and GSM based radio access network technologies, for example by developing Long Term Evolution (LTE) and the Evolved Universal Terrestrial Radio Access Network (E-UTRAN).

LTE is a technology for realizing high-speed packet-based communication that may reach high data rates both in the downlink and in the uplink. In LTE, network nodes, or base stations, which may be referred to as evolved-NodeBs, eNodeBs or even eNBs, may be connected to a gateway e.g. a radio access gateway, which in turn may be connected to one or more core networks.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

One important focus area in E-UTRAN standardisation work is to ensure that the new network is simple to deploy and cost efficient to operate. This disclosure concerns a method for random access interference avoidance, typically between cells of different sizes, for example between a macro cell on the one hand and a micro/pico/femto or even a relay on the other. This situation may further be referred to as a heterogeneous network, sometimes referred to as a hetnet.

In LTE the downlink is based on Orthogonal Frequency Division Multiplexing (OFDM) while the uplink is based on a single carrier modulation method known as Discrete Fourier Transform Spread OFDM (DFT-S-OFDM).

In this document is embodiments related to the LTE random access disclosed. Therefore, the random access procedure for LTE as it is currently defined by 3GPP is briefly summarised. Subsequently, the LTE random access concept will be briefly presented.

During initial access, the user equipment seeks access to the network in order to register and commence services. The Random Access (RA) serves as an uplink control procedure to enable the user equipment to access the network. Since the initial access attempt cannot be scheduled by the network, the random access procedure is by definition contention based. Collisions may occur and an appropriate contention-resolution scheme needs to be implemented. Including user data on the contention-based uplink is not spectrally efficient due to the need for guard periods and retransmissions. Therefore, it has been decided to separate the transmission of the random access burst (preamble), whose purpose is to obtain uplink synchronisation, from the transmission of user data.

The random access procedure serves two main purposes: to let the user equipment align its uplink timing to that expected by the network node, or eNodeB, in order to minimize interfering with other uplink transmissions made by other user equipment. Uplink time alignment is a requirement in E-UTRAN before data transmissions may commence.

In addition, the random access procedure also provides a means for the user equipment to notify the network of its presence and enables the network node to give the user equipment initial access to the system.

Furthermore, in addition to the usage during initial access, the random access may also be used when the user equipment has lost the uplink synchronisation or when the user equipment is in an idle or a low-power mode.

The basic random access procedure comprises a four-phase procedure, wherein the first phase comprises transmission of random access preamble, allowing the network node to estimate the transmission timing of the user equipment. Uplink synchronisation is necessary as the user equipment otherwise cannot transmit any uplink data. In the second phase, the network transmits a timing advance command to correct the uplink timing, based on the timing of arrival measurement in the first phase. In addition to establishing uplink synchronisation, the second phase also assigns uplink resources and temporary identifier to the user equipment to be used in the third phase in the random access procedure. The third phase comprises signalling from the user equipment to the network using the UL-SCH similar to normal scheduled data. A primary function of this message is to uniquely identify the user equipment. The exact content of this signalling depends on the state of the user equipment, e.g., whether it is previously known to the network or not. The last, fourth phase, is responsible for contention resolution in case multiple user equipments tried to access the system on the same resource.

For cases where the network knows, in advance, that a particular user equipment will perform a random access procedure to acquire uplink synchronisation, a contention-free variety of the random access procedure has been agreed. This effectively makes it possible to skip the Contention Resolution process of the last two phases for important cases such as arrival to target cell at handover and arrival of downlink data.

For the event of Random Access overload, a random access back-off procedure is supported. This procedure prevents immediate new Random Access attempts which would only worsen a collision situation.

In case of an overload, the network node signals through the random access response message a back-off indicator TB. The user equipment that does not receive a random access response message that includes the transmitted preamble will wait a time which is uniformly distributed between 0 and TB before attempting random access gain.

The idle mode cell selection and reselection procedure in LTE is based on both stored information, information acquired from broadcasted system information and evaluations of radio frequency measurements by the user equipment.

The cell selection evaluation process is based on a criterion S, which is fulfilled when:

Srxlev>0 AND Squal>0 where:

Srxlev=Qrxlevmeas−(Qrxlevmin+Qrxlevminoffset)−Pcompensation

Squal=Qqualmeas−(Qqualmin+Qqualminoffset)

Where:

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

The signalled values Qrxlevminoffset and Qqualminoffset are only applied when a cell is evaluated for cell selection as a result of a periodic search for a higher priority PLMN while camped normally in a VPLMN. During this periodic search for higher priority PLMN the user equipment may check the S criteria of a cell using parameter values stored from a different cell of this higher priority PLMN.

Self-backhauling relays are considered for LTE Advanced. LTE-Advanced extends LTE Rel-8 with support for relaying as a tool to improve e.g. the coverage of high data rates, temporary network deployment, the cell-edge throughput and/or to provide coverage in new areas.

The connection such as e.g. Un between the network node and the relay node may be inband, in which case the link from the network node to the relay node share the same band with direct network node to user equipment links within the donor cell. However, the Un connection between the network node and the relay node may be outband, in which case the link from the network node to the relay node does not operate in the same band as direct network node to user equipment links within the donor cell. At least "Type 1" relay nodes are supported by LTE-Advanced. A "Type 1" relay node is an inband relay node characterised by that it control cells, each of which appears to a user equipment as a separate cell distinct from the donor cell. Also, the cell controlled by the inband relay node have their own Physical Cell ID, i.e. a fingerprint used by user equipment to identify the cell, and transmit their own synchronization channels, reference symbols etc. In the context of single-cell operation, the user equipment receives scheduling information and data transmission feedback directly from the relay node and sends its control channels to the relay node. In addition, the inband relay node appears as a network node to legacy user equipment, i.e. it is backwards compatible. The inband relay node may further be inactive at times for example to save energy. To a large extent, the relay nodes may be perceived as any network node. For example, the connections X2 and S1 between relay node and other network nodes may be established, e.g. partly over Un.

Furthermore, the relay node is handled to a large extent as any user equipment served by the serving network node. For example, when the relay node is installed, it attaches to the network via the user equipment attach procedure, and first when Radio Resource Control (RRC) connectivity is established, the serving network node is informed by the core network that the user equipment in fact is a relay node.

In a cellular network there may be areas with high traffic, i.e. high concentration of user equipment, at least during some time of the day. In those areas it may be desired to deploy additional capacity to keep the user satisfaction. The added capacity may then be in the form of additional macro base station, or to deploy nodes with lower output power and thus covering a smaller area in order to concentrate the capacity boost on a smaller area.

There may also be areas with bad coverage where there is a need for coverage extension, and again one way to do that may be to deploy a node with low output power to concentrate the coverage boost in a small area.

One argument for choosing nodes with lower output power in the above cases may be that the impact on the macro network may be reduced, or even minimized, as it is a smaller area where the macro network may experience interference.

Currently there is a strong drive in the industry in the direction towards the use of low power nodes. The different terms used for this type of network deployments are Heterogeneous networks, multilayer networks or shortly HetNets.

Thus a macro base station, as the network node may be referred to, provides a wide area coverage, also called macro cell. Low power nodes are deployed to provide small area capacity/coverage. Some examples of such low power nodes may be pico base stations, relays, home base stations and/or femto cells. A pico base station may either be similar to a macro network node but typically with more limited coverage for example featuring a lower max transmission power, or a remote radio unit connected to a main unit. A common term for the pico/relay/femto cells is underlay cells, served by underlay nodes. The cells may either be open access, or providing access only to a Closed Subscription Group (CSG).

The femto base stations, or any underlay nodes, may be connected to the MME via a femto gateway, providing any or all of the following features: Control plane signalling to/from the MME via the interface S1_MME; user plane data to/from the packet gateway via the interface S1_U; and/or OaM interface based on Broadband Forum TR-069.

Furthermore, the underlay nodes may be interconnected as well as connected to other network nodes via X2 interfaces.

The interaction between network nodes, or macro eNodeBs, on the one hand and the underlay nodes on the other hand may be one of the following: No interaction at all. This may be the case when X2 is not available, e.g. for close access femto cells. The interaction may further be a loose interaction. This may be the case when X2 is available. A third option for the interaction between network nodes and underlay nodes may be tight interaction. This may be the case when underlay node is a remote unit, typically connected to the macro network node via a low latency connection.

The underlay nodes may typically operate at lower reference (pilot/perch) signal powers compared to the macro network nodes. This means that if the cell selections as well as mobility decisions are based on received reference signal strengths, the downlink cell border is closed to the underlay node than to the macro network node. If the uplink sensitivity for all cells is similar, or if the difference in uplink sensitivity is not equivalent to the difference in reference (pilot/perch) signal powers, then the uplink cell border will be different from the downlink cell border.

This means that a user equipment served by the macro network node may have the best uplink to an underlay node, causing extensive uplink interference even without having detected the underlay reference signal.

One means to relieve this situation is to consider an underlay cell range expansions by considering offsets in the cell selection and/or mobility decisions. This is referred to as Cell Range Expansion (CRE). Thereby, potentially interfering user equipment served by the macro network nodes are further away from the underlay node and thereby inducing less interference. However, this also means that some user equipment served by the underlay node may be critically interfered by the macro network node in the downlink.

One way to manage this interference is via announced almost blank subframes in the macro network node, where the macro network node avoids scheduling users in selected subframes, so that the underlay node may schedule user equipment in these low interference subframes. Similarly, the macro network node may schedule user equipment in the selected subframes, but at a reduced power level. The macro node may or may not also consider transmitting downlink control information in selected subframes, possibly at reduced power levels.

Cell range expansion may be considered in both idle and connected mode. The main difference between the two situations is the signalling means and the knowledge about the user equipment. In idle mode, there is a need to support random access and paging—procedures that involve user equipment that the network has no or very little information about considering the radio propagation and interference situation. Moreover, signalling is more limited and restricted to broadcast or stored information from previous connection sessions.

On the contrary, in connected mode, there may be quite good information about the user equipment with respect to its radio situation. Furthermore, dedicated signalling means to specific user equipment are available.

There are several issues with supporting cell range expansion and adequate interference avoidance with almost blank subframes for idle mode user equipments as discussed above. However, if not considering cell range expansion for idle mode user equipment, then they will immediate perform handover to the underlay node from the macro network node when establishing an RRC connection if cell range expansion is employed in connected mode. This may however generate many handovers.

SUMMARY

It is therefore an object to obviate at least some of the above mentioned disadvantages and to improve the performance in a wireless communication system.

According to a first aspect, the object is achieved by a method in a network node, which is serving a user equipment. The method aims at instructing the user equipment to send a measurement report in a wireless communication network comprising the network node and an underlay network node. The method comprises estimating an amount of data the user equipment is expected to communicate. Further, the method comprises determining the user equipment to be a candidate for hand over to the underlay network node, based on the estimated amount of data. Further, the method comprises instructing the user equipment to send a measurement report.

According to a second aspect, the object is achieved by a network node, which is serving a user equipment. The network node aims at instructing the user equipment to send a measurement report in a wireless communication network comprising the network node and an underlay network node. The network node comprises a processing circuitry, configured to estimate an amount of data the user equipment is expected to communicate. The processing circuitry is also configured to determine that the user equipment is a candidate for hand over to the underlay network node, based on the estimated amount of data. The processing circuitry is also configured to instruct the user equipment to send a measurement report.

Thanks to embodiments disclosed herein, extensive handovers due to cell range expansion may be avoided by only considering cell range expansion when the user equipment is in connected mode in selected cases. This means more efficient use of radio resources. Moreover, the herein described embodiments avoid idle mode cell range expansion.

According to embodiments disclosed herein, the user equipment with only little data to send will not cause critical uplink interference to small cells if being served by the macro network node. Moreover, they will not offload the macro network node much by being handed over to the underlay node. Therefore, from a system perspective, it is advantageous not to facilitate handover of user equipment with little data to communicate, to the underlay node.

Also, uplink power headroom information may be used to further limit the user equipment in the need for cell range expansion, which means that less signalling is needed. Thus is an improved performance within the wireless communication system is achieved.

Other objects, advantages and novel features will become apparent from the following detailed description of the present methods, network node and user equipment.

BRIEF DESCRIPTION OF THE DRAWINGS

The methods, network node and user equipment are described in more detail with reference to attached drawings illustrating examples of embodiments in which.

DETAILED DESCRIPTION

Embodiments herein are defined as a network node, a method in a network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 1A:
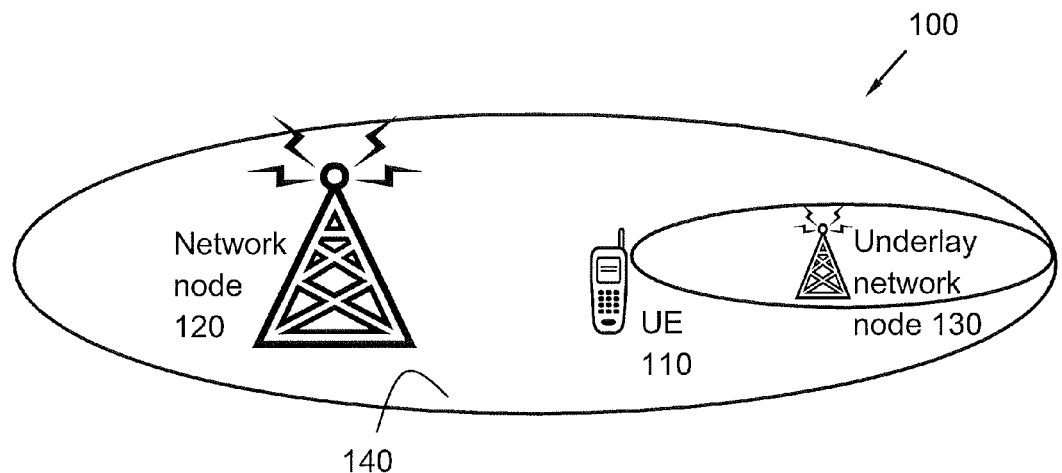
FIG. 1A is a schematic block diagram illustrating an example of a wireless communication system according to some embodiments.

FIG. 1A depicts a wireless communication system 100. The wireless communication system 100 may at least partly be based on radio access technologies such as e.g. 3GPP LTE, LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies e.g. CDMA2000 1x RTT and High Rate Packet Data (HRPD), just to mention some few options.

The wireless communication system 100 may further be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1A is to provide a simplified, general overview of the methods and network nodes herein described, and the functionalities involved. The methods and network nodes will subsequently, as a non-limiting example, be described in a 3GPP/LTE environment, but the embodiments of the disclosed methods may operate in a wireless communication system 100 based on another access technology.

The wireless communication system 100 comprises at least one network node 120, which is a macro network node serving a cell 140, in which an underlay node 130 is situated, as well as a user equipment 110, served by the network node 120. Thus the wireless communication system 100 comprises a heterogeneous network, or Hetnet, as previously described. The network node 120 may communicate with the underlay node 130 either over a backhaul link, in case the underlay node 130 comprises a relay node, or via an X2 or S2 communication interface, in case the underlay node 130 comprises a micro node, a pico node, a femto node or similar.

The user equipment 110 is thus served by the network node 120. However, the user equipment 110 may move and enter an underlay cell, served by the underlay network node 130, in which case the user equipment 110 may transmit a measurement report, triggering a handover of the user equipment 110 to the underlay network node 130. Further, the network node 120 may determine for other reasons such as e.g. load balancing that it would be appropriate to hand over the user equipment 110 to the underlay network node 130.

According to the current 3GPP standard for LTE, the network node 120 and/or the underlay network node 130 may transmit Reference Signals with constant power. The transmitted reference signal has the same Energy Per Resource Element across the entire band used in the cell 140. The Radio Resource Control (RRC) protocol describes an information element called Physical Downlink Shared Channel Config. (PDSCH-Config) by which the serving network node 120 may inform the user equipment 110 about the power level of the transmitted reference signal. The transmitted reference signal may also be referred to as "referenceSignalPower". The user equipment 110 may use this information together with the measured Reference Signal Received Power (RSRP) to estimate the pathgain between the serving network node 120 and the user equipment 110. This measurement is then used by the user equipment 110 to control the uplink power. Since the user equipment 110 reports RSPR measurements to the serving network node 120, upon request from the network node 120, then the serving network node 120 may have enough information to estimate e.g. the pathgain between itself and the reporting user equipment 110, but also to determine if the user equipment 110 is a candidate for being handed over to the underlay network node 130.

The user equipment 110 is configured to transmit radio signals comprising information to be received by the serving network node 120, and/or the underlay network node 130. Further, the user equipment 110 is configured to receive radio signals comprising information transmitted by the network node 120 and/or the underlay network node 130. The communication between the network node 120 and/or the underlay network node 130, and the user equipment 110 may thus be made wirelessly.

It is to be noted that the illustrated network setting of network node 120, underlay node 130 and user equipment 110 in FIG. 1A is to be regarded as a non-limiting embodiment only. The wireless communication network 100 may comprise any other number and/or combination of network node 120, underlay node 130 and user equipment 110, although only one instance of each of them, respectively, are illustrated in FIG. 1A for clarity reasons. A plurality of network nodes 120, underlay nodes 130 and/or user equipment units 110 may further be involved in the present methods according to some embodiments.

Thus whenever "one" or "a/an" network node 120, underlay node 130 and/or user equipment 110 is referred to in the present context, a plurality of network nodes 120, underlay nodes 130 and/or user equipment units 110 may be involved, according to some embodiments.

The first network node 120 may according to some embodiments be referred to as e.g. base station, NodeB, evolved Node B (eNB, or eNode B), base transceiver station, Access Point Base Station, base station router, Radio Base Station (RBS), macro base station, micro base station, pico base station, femto base station, Home eNodeB, sensor, beacon device or any other network node configured for communication with the user equipment 110 over a wireless interface, depending e.g. of the radio access technology and terminology used.

The underlay node 130 may according to some embodiments be referred to as e.g. a relay node and/or a repeater, a pico node, a micro node, a femto node etc. and be configured for communication with the user equipment 110 over a wireless interface.

In the subsequent part of the disclosure, in order to not unnecessarily complicate the explanation, the methods and structural elements comprised in the scenario depicted in FIG. 1A will be described, wherein the term "network node" will be used for the network node 120, while the term "underlay node" will be used for the underlay node 130, in order to facilitate the comprehension of the present methods.

The user equipment 110 may be represented by e.g. a wireless communication terminal, a mobile cellular phone, a Personal Digital Assistant (PDA), a wireless platform, a mobile station, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the network node 120 and/or the underlay node 130.

The network node 120 controls the radio resource management within the cell 140, such as e.g. allocating radio resources to the user equipment units 110 within the cell 140 and ensuring reliable wireless communication link between the network node 120 and the user equipment 110. The network node 120 may comprise an eNodeB, e.g. in an LTE-related wireless communication system 100.

Embodiments of the herein disclosed methods considers no cell range expansion in idle mode and uses transmission status information, such as e.g. buffer status info, power headroom, and similar according to different embodiments from the user equipment 110 to decide whether it is reasonable to configure cell range expansion when establishing an RRC connection.

Figure 1B:
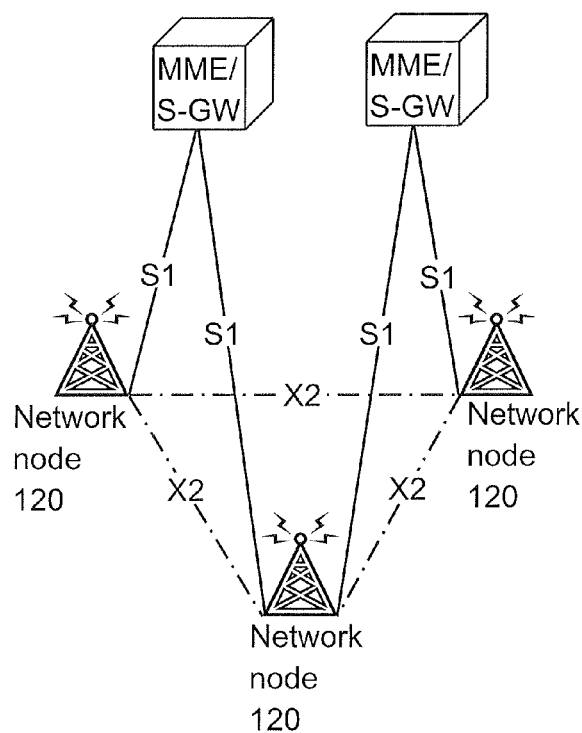
FIG. 1B is a schematic block diagram illustrating an example of an embodiment.

FIG. 1B illustrates an embodiment of the wireless communication system 100 in a LTE radio access technology structure. However, the herein described embodiments may be equally applicable to other radio access technologies as well.

The architecture of the LTE system is shown in FIG. 1B, comprising radio access nodes, or network nodes 120 and evolved packet core nodes (MME/S-GW).

Figure 1C:
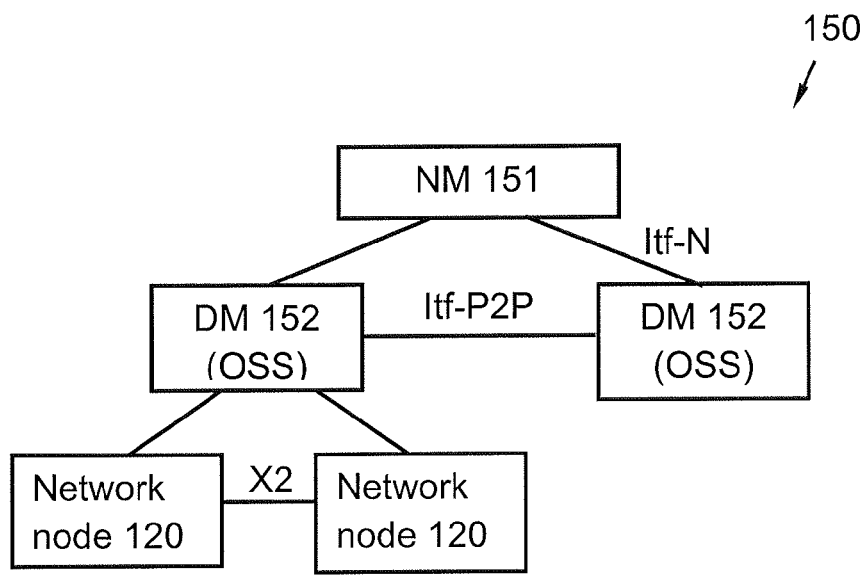
FIG. 1C is a schematic block diagram illustrating an example of an embodiment.

FIG. 1C illustrates an embodiment of a management system 150, which may be utilised when performing the herein described methods, according to some embodiments.

The node elements, or network nodes 120, also referred to as eNodeB, may be managed by a domain manager (DM) 152, also referred to as the operation and support system (OSS). A domain manager 152 may further be managed by a network manager (NM) 151. Two network nodes 120 may be interfaced by X2, whereas the interface between two domain managers 152 may be referred to as Itf-P2P, according to some embodiments.

Figure 1D:
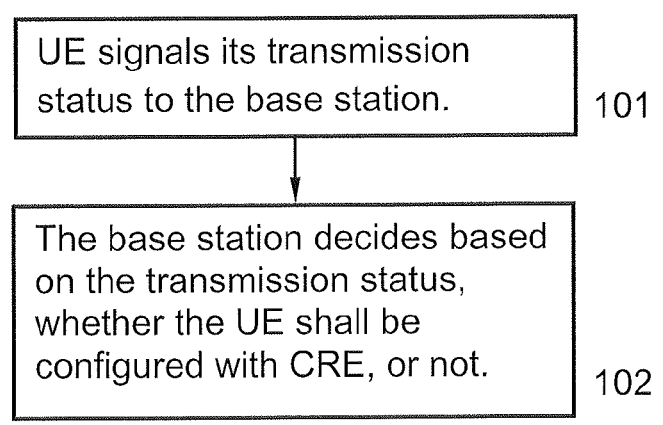
FIG. 1D is a schematic flow chart illustrating an example of an embodiment of a method.

FIG. 1D illustrates a conceptual embodiment comprising a method that considers the transmission status of the user equipment 110 when determining whether the user equipment 110 may be configured with cell range expansion or not. The conceptual embodiment comprises a first part 101, wherein the user equipment 110 provides information concerning its transmission status to the network node 120. Further, the conceptual embodiment comprises a second part 102. The second part 102 comprises that the network node 120 decides, based on the transmission status of the user equipment 110, provided in the first part 101, whether the user equipment 110 may be configured with cell range.

Thereby, the transmission status information of the user equipment 110, provided by the user equipment 110 to the network node 120, to determine whether the user equipment 110 may be considered for cell range expansion, or not.

Thereby, according to some embodiments disclosed herein comprising a method in a network node 120 with a user equipment 110 providing the receiving network node, which may be the serving base station, with transmission status information, where the receiving network node may use the received transmission status information to determine a suitable cell range expansion for the user equipment 110.

According to some embodiments, the transmission status information may comprise buffer status information. Further, according to some embodiments, the transmission status information includes power headroom information.

If the buffer status information indicates that the user equipment 110 has a significant amount of data to be transmitted, such as for example exceeding a predetermined or configurable threshold value, then a less aggressive cell range expansion may be configured with the user equipment 110, otherwise a more aggressive range expansion may be configured with the user equipment 110. A less aggressive cell range expansion may comprise no cell range expansion at all. A more aggressive range expansion may be realised by addition of an offset value, to be added to a signal strength value, or a signal radio condition value, of a signal received from the underlay network node 130 as perceived and measured by the user equipment 110.

The significant data indication may according to embodiments be determined based on the random access preamble group selected by the user equipment 110, i.e. group A and/or group B respectively.

The significant data indication may alternatively be determined if the reported buffer status report exceeds a predetermined threshold value, according to some embodiments.

The cell range expansion configuration of the user equipment 110 may be a function of one or more of the buffer status report and/or the power headroom report according to different embodiments. Further, any, some, or all of the herein enumerated and utilised parameters and threshold values may be configured by an operation and maintenance node within the wireless communication system 100.

Furthermore, the transmission status of the user equipment 110, according to some embodiments may be obtained from the user equipment 110 in a different ways according to different embodiments. According to some embodiments, the user equipment 110 with relatively good radio conditions and much data to send may select a random access preamble from group B if it is configured. Thereby, crude transmission status information may be provided to the serving network node 120. The user equipment 110 may further comprise a buffer status report and/or a power headroom report in the third message of the random access procedure, which will be further explained in conjunction with presentation of FIG. 2. The user equipment 110 may further, according to some embodiments comprise a buffer status report and/or a power headroom report as part of the signalling to the serving network node 120, while in connected mode.

An embodiment wherein the transmission status of the user equipment 110 is provided to the serving network node 120 via Random Access Preamble Selection will subsequently be described.

According to some embodiments, two random access preamble groups may be defined, such as e.g. group A and group B. The preamble group selection may then be performed by the user equipment 110 for informing the receiving network node 120 about the user equipment 110 transmission status. The user equipment 110 may select a preamble from group B in case the user equipment 110 has relatively good radio conditions and/or rather much data to transmit. In one embodiment, only user equipment 110 using preambles from group B may eventually be configured with cell range expansion, while user equipment 110 using preambles from group A may be configured without cell range expansion.

In another embodiment, user equipment 110 with preambles from group B may be configured, by the serving network node 120 with a more aggressive cell range expansion, i.e. a wider expansion, e.g. by applying an offset value, or a bigger offset value, while user equipment 110 with preambles from group A are configured with less aggressive cell range expansion, i.e. less wide expansion, e.g. by not applying any offset value, or a smaller offset value than in the first case.

Furthermore, a network node within the wireless communication system 100, such as e.g. an operations and maintenance node, may configure the random access group selection parameters depending on the observed offloading in the network as well as mobility performance statistics. If the offloading is considered unsatisfactory, then the preamble selection parameters may be adjusted to facilitate preamble group B selection, such as decreasing the buffer size threshold and/or increasing the pathloss threshold, according to some embodiments.

Figure 2:
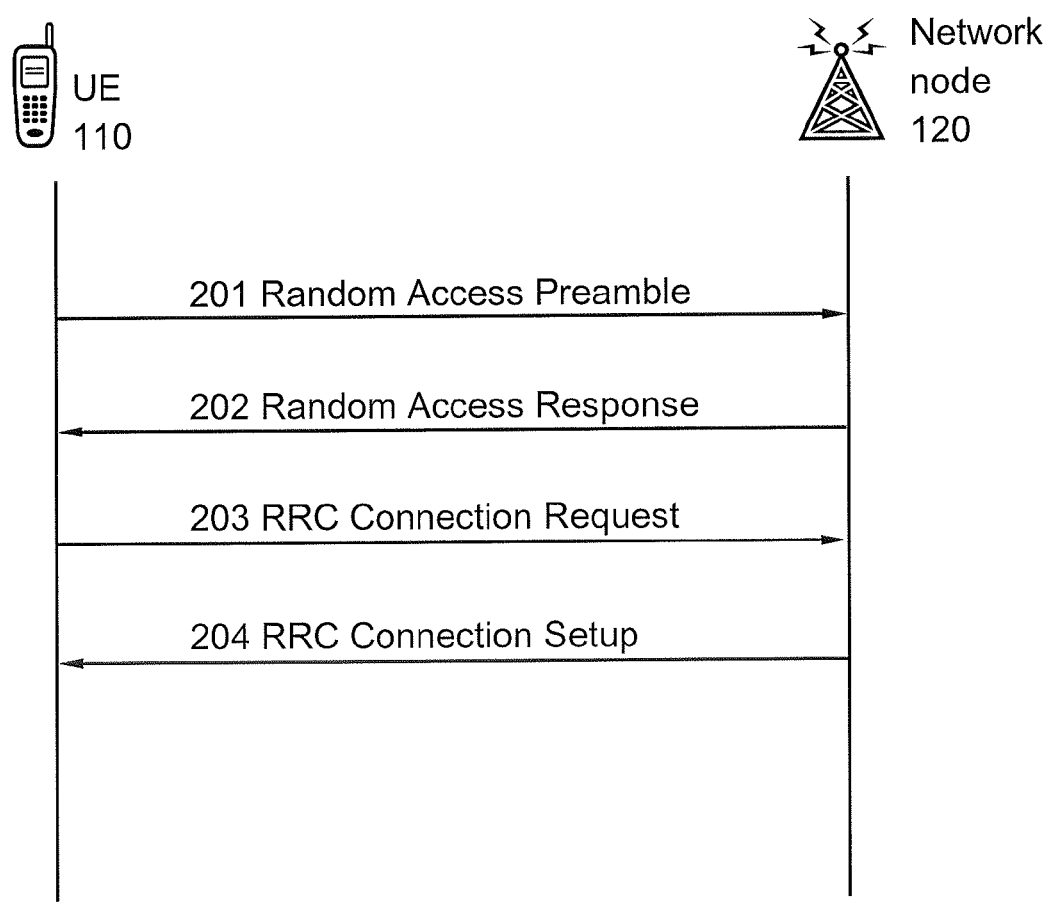
FIG. 2 is schematically illustrating random access in a wireless communication system according to prior art.

Another embodiment, wherein the transmission status of the user equipment 110 is provided to the serving network node 120 via Random Access Message will furthermore be described and illustrated in FIG. 2. The basic random access procedure may comprise a four-phase procedure as outlined in FIG. 2.

Phase 201

Phase 201 comprises transmission of a random access preamble, allowing the network node 120 to estimate the transmission timing of the user equipment 110. Uplink synchronisation may be an advantage as the user equipment 110 otherwise may not transmit any uplink data.

Phase 202

Phase 202 comprises that the network node 120 transmits a timing advance command to correct the uplink timing, based on the timing of arrival measurement in the first phase 201. In addition to establishing uplink synchronisation, the second phase 202 may also assign uplink resources and temporary identifier to the user equipment 110 to be used in the third phase 203 in the random access procedure.

Phase 203

Phase 203 comprises signalling from the user equipment 110 to the network node 120 using the UL-SCH similar to normal scheduled data. A primary function of this message is to uniquely identify the user equipment 110. The exact content of this signalling may depend on the state of the user equipment 110, e.g., whether it is previously known to the network or not.

Phase 204

Phase 204, the final phase, is responsible for contention resolution in case multiple user equipment 110 tried to access the system on the same resource.

For cases where the network node 120 knows, in advance, that a particular user equipment 110 will perform a random access procedure to acquire uplink synchronisation, a contention-free variety of the random access procedure may be possible. This effectively makes it possible to skip the Contention Resolution process of phases 203 and 204 for some particular cases such as arrival to target cell at handover and arrival of downlink data.

Embodiments of the enumerated four phases 201-204 comprised in the random access procedure will subsequently be further explained.

Phase 201—Random Access Preamble

Prior to sending a preamble, the user equipment 110 may synchronise to the downlink transmissions and read the Broadcast Control Channel (BCCH). The BCCH may reveal e.g. where the random access time slots are located, which frequency bands may be used and which preambles (sequences) are available.

There may be two random access preamble groups defined, group A and group B, according to some embodiments. If the potential message size including headers is greater than a threshold value, such as e.g. messageSize-GroupA, and if the pathloss is less than another threshold value, then the user equipment 110 may select a preamble from group B, otherwise from group A. This means that user equipment 110 with relatively good radio propagations and much data to send may select a preamble from group B, according to embodiments.

At the next random access slot, the user equipment 110 may send the preamble. The preamble sequence implicitly includes a random identity (ID) which identifies the user equipment 110. LTE provides 64 such random IDs and thus 64 preambles for each cell 140.

If multiple random access frequency bands have been defined, the user equipment 110 may randomly select one of them. The group of sequences allocated to a cell 140 may be partitioned into two subgroups. By selecting a preamble sequence from a specific subgroup, the user equipment 110 may give a single-bit indication of its resource requirement and/or link quality. The particular sequence used for the preamble may be randomly selected within the desired subgroup. This sequence implicitly may comprise a random identity which may serve as a user equipment identifier. The network node 120 may estimate the uplink timing of the user equipment 110 based on the timing of the received preamble.

Phase 202—Random Access Response

After the preamble transmission, the user equipment 110 may wait for a random access response message on the DL-SCH, the downlink assignment which is indicated on the L1/L2 control channel (DPCCH). The random access Response message in phase 202 is transmitted semi-synchronously (i.e. within a window) to the reception of the random access Preamble in phase 201, in order to allow the scheduler more flexibility. The random access response 202 may comprise the same random user equipment identity as present in the preamble. Further, it may comprise a time alignment message to provide the proper uplink timing to the user equipment 110. Also, in addition, it may comprise a temporary Radio Network Temporary Identifier (RNTI) which is unique for the particular random access resource (time, channel and preamble) used in phase 201. For initial access, the temporary radio network temporary identifier may be used for phases 203 and 204. Additionally, it may further comprise an uplink resource grant for transmission on UL-SCH in phase 203 according to some embodiments.

If no random access response message has been received after a certain time following the preamble transmission, the user equipment 110 may send a new preamble at the next random access time slot. In some cases the network node 120 may indicate an overload, i.e. too many preambles detected and instruct the user equipment 110 to wait for some time before attempting random access again. For the new attempt, the user equipment 110 may select new, random parameters for the preamble sequence and the non-synchronized random access frequency band. Furthermore, the user equipment 110 may increase the power level of the preamble to obtain a power ramping procedure similar as used in WCDMA.

Phase 203—First Scheduled UL Transmission

In phase 203, the user equipment 110 provides the network node 120 with a unique identifier in the message it transmits on UL-SCH according to the grant contained in the random access response 202. The type of user equipment identifier, e.g. cell radio network temporary identifier (C-RNTI), Temporary Mobile Subscriber Identity (TMSI), International Mobile Subscriber Identity (IMSI) or International Mobile Equipment Identity (IMEI), may depend on which extent the user equipment 110 is already known by the network node 120.

In case of initial access, the message may be an RRC Connection Request message. In case of non-initial access, i.e. when the user equipment 110 is already RRC_CONNECTED, the user equipment identifier may be the C-RNTI and is signalled by the MAC layer. The transmission may use Hybrid Automatic Repeat ReQuest (HARQ). It is also possible to include information about the buffer status and the power headroom of the user equipment 110 according to some embodiments.

Phase 204—Contention Resolution

The purpose of the fourth phase 204 is to resolve contention. Note that, from the second phase 202, multiple user equipment 110 performing simultaneously random access attempts using the same preamble may listen to the same response message and therefore may have the same temporary identifier. Hence, in the fourth phase 204, the network node 120 echoes the user equipment identity provided by the user equipment 110 in phase 203. Only a user equipment 110 which finds a match between the identity received in the fourth phase 204 and the identity transmitted as part of the third phase 203 will declare the random access procedure successful. This user equipment will also transmit a HARQ acknowledge in the uplink. For non-initial access, i.e. when the user equipment 110 is already in connected mode, RRC_CONNECTED, the user equipment identity may be reflected on the L1/L2 control channel. If the user equipment has not yet been assigned a C-RNTI, the temporary identity from the second phase 202 may be promoted to the C-RNTI, otherwise the user equipment 110 may keep its already assigned C-RNTI.

User equipment 110 which do not find a match between the identity received in phase 204 and the respective identity transmitted as part of phase 203 are considered to have failed the random access procedure and may require to restart the random access procedure with phase 201; selecting new random parameters for the preamble sequence. No HARQ feedback may be transmitted from these user equipment units 110.

Contention-Free Random Access Procedure

For cases where the network node 120 knows, in advance, that a particular user equipment 110 will perform a Random Access Procedure to acquire uplink synchronization, a dedicated preamble may be reserved and assigned to the user equipment 110 under consideration. Dedicated Preamble assignment for handover may be handled by RRC whereas preamble assignment for downlink data arrival may be handled by MAC. When the user equipment transmits the dedicated preamble in phase 201, the network knows to which user equipment 110 this preamble was assigned and can already at the time of detection of this preamble determine the identity of the user equipment. Thus no contention resolution may be required and the delay before resuming data transmission may be reduced.

The user equipment 110 may inform the receiving network node 120 about its transmission status via the random access information exchange. For example, the message 203 may contain the user equipment 110 buffer status and power headroom reports, according to some embodiments.

In one embodiment, only user equipment 110 with a buffer status exceeding a predetermined threshold value may be configured with cell range expansion, or with a more aggressive cell range expansion, while the rest of the user equipment 110 with a buffer status lower than the predetermined threshold may be configured without cell range expansion, or with a less aggressive cell range expansion.

In another embodiment, user equipment 110 with a power headroom below a threshold value may indicate that those user equipment 110 are in need of a favourable uplink, and may therefore be configured with cell range expansion, or with a more aggressive cell range expansion, while the rest, or other user equipment 110 with a power headroom exceeding the threshold value, may be configured without cell range expansion or with a less aggressive cell range expansion, according to some embodiments.

In yet another embodiment, user equipment 110 with a power headroom below the threshold value, and with a buffer status greater than another threshold value, may be configured with cell range expansion, or alternatively with a more aggressive cell range expansion, while the rest may be configured without cell range expansion, or alternatively with a less aggressive cell range expansion, according to some embodiments.

According to some further embodiments, the transmission status of the user equipment 110 may be signalling in connected mode.

Essentially the same or similar signalling as in the Random Access Message 203 in FIG. 2 may be applied also in connected mode. In addition, one may consider a timer that is started when it is detected that the user equipment 110 is in connected mode, e.g. when the RRC connection is established, and if the user equipment 110 is still connected when the timer expires, then the user equipment 110 may be configured with cell range expansion, or alternatively more aggressive cell range expansion, while the user equipment 110 initially may be configured without cell range expansion, or alternatively less aggressive cell range expansion.

The idle mode procedure above may partly be based on a parameter Qrxlevmin broadcasted to the user equipment 110 via the System Information (SIB7). It may be used as a means to introduce uplink aspects in the cell selection. For example, if the uplink sensitivity of the serving network node 120 is high, then a lower Qrxlevmin may be used and vice versa, according to some embodiments.

In one embodiment, characterised by different Qrxlevmin in the macro and underlay cell layer, the idle mode cell selection procedure may enforce the user equipment 110 to select a different cell than the one corresponding to the best downlink radio conditions. The setting of the Qrxlevmin may thus a function of the max power of the user equipment 110, the pilot powers used in the macro layer and the pico layer, as well as the radio condition requirements for successful random access response and paging reception.

In another embodiment, for example characterised by a low power node being deployed at a location due to insufficient macro uplink coverage, it may be an advantage to set a lower Qrxlevmin for a low power node, or the underlay network node 130, than for the macro network nodes 120.

The herein disclosed mechanisms may in some embodiments be applied within general cells 140 served by general network nodes 120, or base stations, even though the considered example is based on a network node 120, and an underlay network node 130, or macro eNodeBs and pico eNodeBs, respectively. In WCDMA, this may be implemented in a Radio Network Controller (RNC), which may consider (re)configuring the measurement configuration so that the user equipment 110 considers offsets when evaluating cell measurements as part of event triggering, according to some embodiments.

Figure 3:
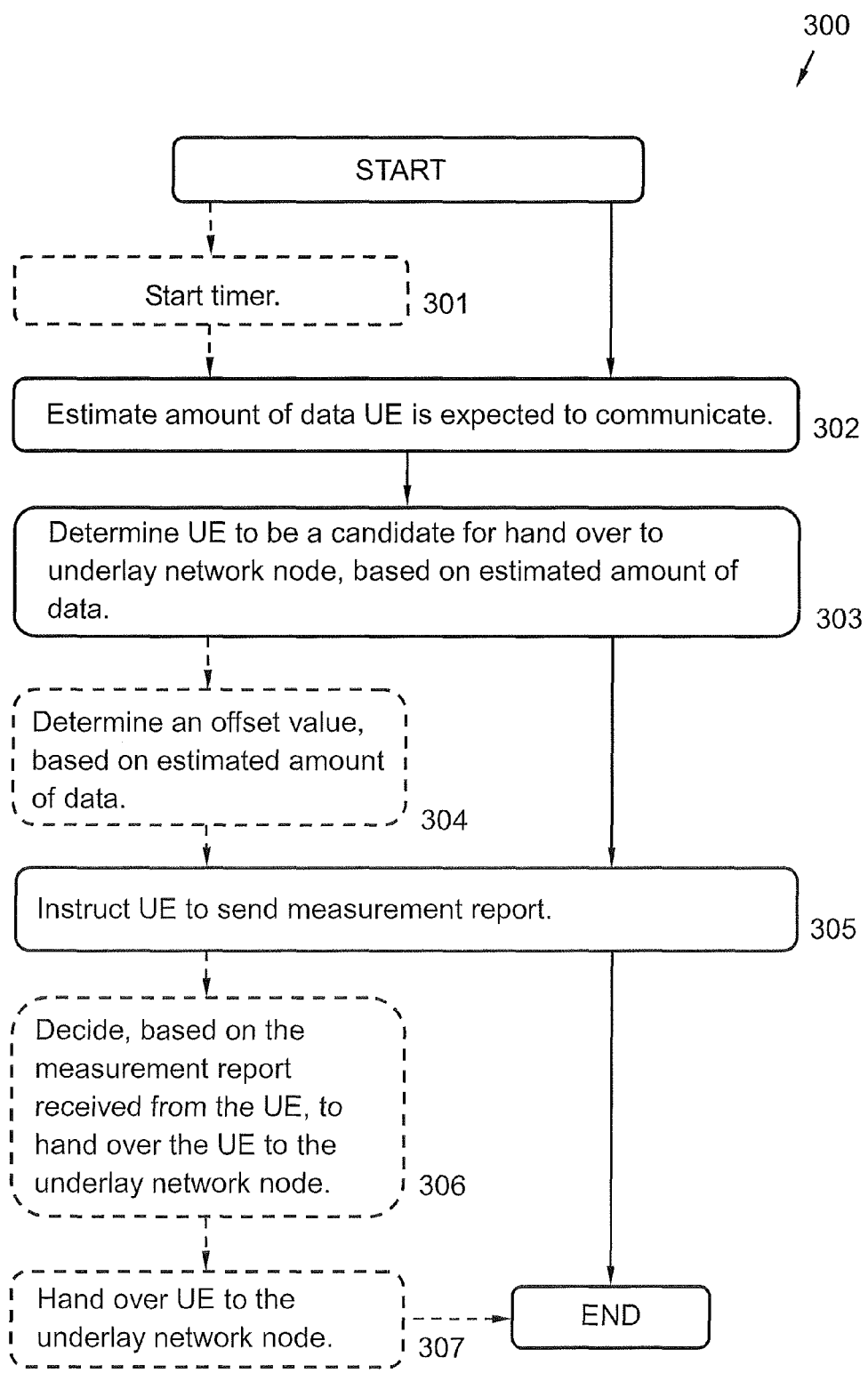
FIG. 3 is a schematic flow chart illustrating examples of actions comprised in embodiments of the method in a network node.

FIG. 3 is a flow chart illustrating embodiments of a method 300 in a network node 120. The network node 120 is serving a user equipment 110. The method 300 aims at instructing the user equipment 110 to send a measurement report in a wireless communication network 100 comprising the network node 120 and an underlay network node 130.

The wireless communication system 100 may be based on Long-Term Evolution (LTE) within the Third Generation Partnership Project (3GPP) according to some embodiments, wherein the network node 120 may comprise a macro base station such as e.g. an Evolved Node B. The underlay network node 130 may comprise a micro node, a pico node, a femto node, a relay node or similar, according to some embodiments.

The measurement report to be composed by the user equipment 110 may comprise signal radio condition values measured by the user equipment 110 of reference signals transmitted by the network node 120 and the underlay network node 130. The signal radio condition values may comprise e.g. signal strength measurements, signal quality measurements, Reference Signal Received Power (RSRP) measurements in e.g. a 3GPP LTE environment, or any other similar measurement relating to the received radio propagation conditions as perceived by the user equipment 110 of signals transmitted by the network node 120 and the underlay network node 130.

Also, the method 300 according to some embodiments may be performed only if the user equipment 110 is in active mode, or connected mode. Thereby, it may be avoided to make handover of user equipment 110 which anyway is not in active state and thus neither take advantage of the improved performance enabled by the present method 300, nor contribute to any interference.

To appropriately instruct the user equipment 110 to send a measurement report, and/or to determine if a handover of the user equipment 110 is to be made to the underlay network node 130, the method 300 may comprise a number of actions 301-307.

It is however to be noted that any, some or all of the described actions, may be performed in a somewhat different chronological order than the enumeration indicates, or even be performed simultaneously. Also, it is to be noted that some of the actions such as e.g. 301, 304, 306 and/or 307 may be performed within some alternative embodiments. The method 300 may comprise the following actions:

Action 301

This action may be comprised within some alternative embodiments, but not necessarily within all embodiments of the method 300.

A timer 440 may be started at a point in time when the user equipment 110 has been determined to be in connected mode, or active mode, according to some embodiments. The timer 440 may be started when the user equipment 110 swap from idle mode to connected mode, according to some embodiments. However, according to some embodiments, the timer 440 may be started when the user equipment 110 enter the cell 140 in connected mode, or any other arbitrary point in time when it is detected that the user equipment 110 is in connected mode, according to some embodiments.

Action 302

An amount of data the user equipment 110 is expected to communicate is estimated.

The communication may be in the downlink or in the uplink, or both, according to different embodiments.

The estimation of the amount of data the user equipment 110 is expected to communicate, may be based on a random access preamble received from the user equipment 110, wherein the group of preambles from which the received random access preamble may be selected corresponds to the amount of data the user equipment 110 is expected to communicate.

However, the amount of data the user equipment 110 is expected to communicate, may according to some embodiments be based on a buffer status report, received from the user equipment 110.

The amount of data the user equipment 110 is expected to communicate, may be estimated based on a power headroom report, received from the user equipment 110, according to some embodiments.

The amount of data the user equipment 110 is expected to communicate may be estimated according to some embodiments by comparing the data to be transmitted in the downlink to the user equipment 110 with a downlink data threshold value.

The amount of data the user equipment 110 is expected to communicate according to some embodiments may be estimated by analysing the category of data the user equipment 110 is communicating.

The amount of data the user equipment 110 is expected to communicate may be estimated according to some embodiments by analysing the capability of the user equipment 110, such that the user equipment 110 having a capability exceeding a threshold value is expected to communicate more data than the user equipment 110 having a capability below the threshold value.

Action 303

The user equipment 110 is determined to be a candidate for hand over to the underlay network node 130, based on the estimated 302 amount of data.

The user equipment 110 may according to some embodiments be determined 303 to be a candidate for hand over to the underlay network node 130, when the estimated 302 amount of data the user equipment 110 is expected to communicate exceeds a threshold value. The threshold may be predetermined or configurable.

Action 304

This action may be comprised within some alternative embodiments, but not necessarily within all embodiments of the method 300.

An offset value may be determined, based on the estimated 302 amount of data.

The offset value may be determined to be a value which is proportional to the amount of data the user equipment 110 is estimated 302 to communicate, according to some embodiments.

The offset value may be determined to be a first value when the user equipment 110 is estimated 302 to communicate a first amount of data according to some embodiments.

However, the offset value may be determined to be a second value when the user equipment 110 is estimated 302 to communicate a second amount of data, wherein the first value is lower than the second value, and the first amount of data is less than the second amount of data.

In addition, the first value to be determined for the offset value may be within the interval 0-3 dB, while the second value to be determined for the offset value may be within the interval 2-10 dB according to some embodiments.

The offset value may be determined to the first value, according to some embodiments, if the buffer status report is lower than a buffer status threshold value. Further the offset value may be determined to be the second value if the buffer status report exceeds the buffer status threshold value according to those embodiments.

The offset value may further be determined to the first value, according to some embodiments, if the power headroom report is lower than a power headroom threshold value. In addition, the offset value may be determined to the second value if the power headroom report exceeds the power headroom threshold value according to those embodiments.

Also, the offset value may in addition be determined to be the second value according to some embodiments, if a downlink data threshold value is exceeded. Otherwise the offset value to be determined to be the first value according to those embodiments.

Furthermore, the offset value may be determined to be the second value according to some embodiments, if the user equipment 110 is communicating data comprised in a set of categories of data associated with extensive data transport. Otherwise, the offset value may be determined to be the first value according to those embodiments.

In further addition, the offset value may be determined to be the second value according to some embodiments, if the user equipment 110 is comprised in a set of user equipment capabilities associated with extensive data transport. Otherwise the offset value may be determined to be the first value according to those embodiments.

The offset value determination may according to some embodiments comprise starting 301 the timer 440. When the user equipment 110 still is in connected mode when the timer 440 times out, the offset value may be determined to the second value, according to some embodiments. Thereby, if the user equipment 110 is in connected mode for a period of time exceeding a timer limit, it may be considered to have much data to transmit and thereby be appropriate for hand over to the underlay cell 130 by addition of the second offset value.

The offset value may further be determined according to some embodiments to be the first value when the user equipment 110 has experienced a handover failure to, or radio link failure with the underlay network node 130 within a period of time. The period of time may be predetermined or configurable, according to different embodiments.

The offset value may further be determined based on whether interference reduction means such as almost blank subframes has been detected or not according to some embodiments. Moreover, the offset value may be determined based on coverage estimation of the underlay cell, which may be based on estimated radio signal quality, e.g. if the user equipment 110 is served by the underlay network node 130, considering the interference reduction means in the network node 120 in some embodiments.

Action 305

The user equipment 110 is instructed to send a measurement report, to be received by the network node 120.

According to some embodiments, the user equipment 110 may be instructed to send the measurement report instantly, as soon as the instruction is received from the network node 120.

However, according to some embodiments, the network node 120 may instruct the user equipment 110 to send the measurement report by sending the determined 304 offset value to the user equipment 110 and instructing the user equipment 110 to send the measurement report when a first signal radio condition value of a signal received from the network node 120 is exceeded by the determined 304 offset value added to a second signal radio condition value of a signal received from the underlay network node 130.

Action 306

This action may be comprised within some alternative embodiments, but not necessarily within all embodiments of the method.

The network node 120 may according to some embodiments decide, based on the measurement report received from the user equipment 110, to hand over the user equipment 110 to the underlay network node 130.

However, it may be decided to hand over the user equipment 110 to the underlay network node 130, according to some embodiments, by receiving the measurement report received from the user equipment 110 and extracting a first signal radio condition value of a signal received from the network node 120 and a second signal radio condition value of a signal received from the underlay network node 130 from the measurement report. Also, the determined 304 offset value may be added to the second signal radio condition value and the first signal radio condition value may be compared with the second signal radio condition value and the added offset value. Thus, it may be decided to hand over the user equipment 110 to the underlay network node 130 if the second signal radio condition value and the added offset value exceeds the first signal radio condition value.

If it is determined not to handover the user equipment 110 to the underlay network node 130, then the network node 120 may continue to be the serving node of the user equipment 110 and no further actions may be performed. Further, any, some or all of the previously described actions 301, 302, 303 304, 305 and/or 306 may be re-performed instantly, or after a certain time period has past, according to some embodiments. Thus e.g. a watch dog timer functionality may be activated after the decision not to handover the user equipment 110 to the underlay network node 130. It may thereby be asserted that any of the actions 301, 302, 303 304, 305 and/or 306 are not re-performed until the certain time period has passed. The certain time period may be predetermined or configurable, according to different embodiments. Thereby, by enforcing a waiting time before re-performing the actions 301, 302, 303 304, 305 and/or 306 comprised in the method, computing resources and possibly also redundant signalling are saved, in case e.g. the user equipment 110 is stationary, or the radio propagation conditions otherwise may be approximated to be constant within the certain time period within the cell 140.

Action 307

This action may be comprised within some alternative embodiments, but not necessarily within all embodiments of the method. In particular, this action may be performed if it is determined 306 that the user equipment 110 is to be handed over to the underlay network node 130.

The user equipment 110 may be handed over to the underlay network node 130.

The network node 120 may also in some embodiments maintain statistics associated with the method 300. In one embodiment, the network node 120 may maintain counters for number of user equipment 110 determined to be a candidate for hand over to the underlay network node 130, based on the estimated 302 amount of data and number of user equipment 110 not considered to be handover candidates, for example over a monitoring time window. In another embodiment, the network node 120 may maintain counters for number of user equipment 110 determined to be a candidate for hand over to the underlay network node 130, based on the estimated 302 amount of data communicated by the user equipment 110 that also have performed a handover attempt, as well as counters for number of user equipment 110 considered to be handover candidates that did not perform a handover attempt. In another embodiment, the network node 120 may maintain counters for number of user equipment 110 determined to be a candidate for hand over to the underlay network node 130, based on the estimated 302 amount of data communicated by the user equipment 110 that also have performed successful handover attempts, i.e. a successful handover, as well as counters for number of user equipment 110 considered to be handover candidates that did not succeed with the handover attempt, according to some different embodiments.

According to embodiments wherein any, some or all of the above statistics is collected by the network node 120, the collected statistics may be further reported to the management system 150. In an LTE configuration, the network node 120 may forward the collected statistics to the domain manager 152, which may be configured to gather statistics from a plurality of network nodes 120, and possibly perform calculations, which in turn may be utilised e.g. for further fine tuning of the offset values, and/or any of the threshold values involved. However, in some embodiments, the domain manager 152 may in turn be configured to forward the statistics to the network manager 151. According to some such embodiments, the network manager 151 may be configured to gather statistics from a plurality of network nodes 120, and possibly perform calculations, which in turn may be utilised e.g. for further fine tuning of the offset values, and/or any of the threshold values involved. Thereby, the management system 150, or any appropriate node comprised within it, such as the domain manager 152 or the network manager 151 may configure certain parameters of the method 300, such as the offset values, and/or any of the threshold values.

Figure 4:
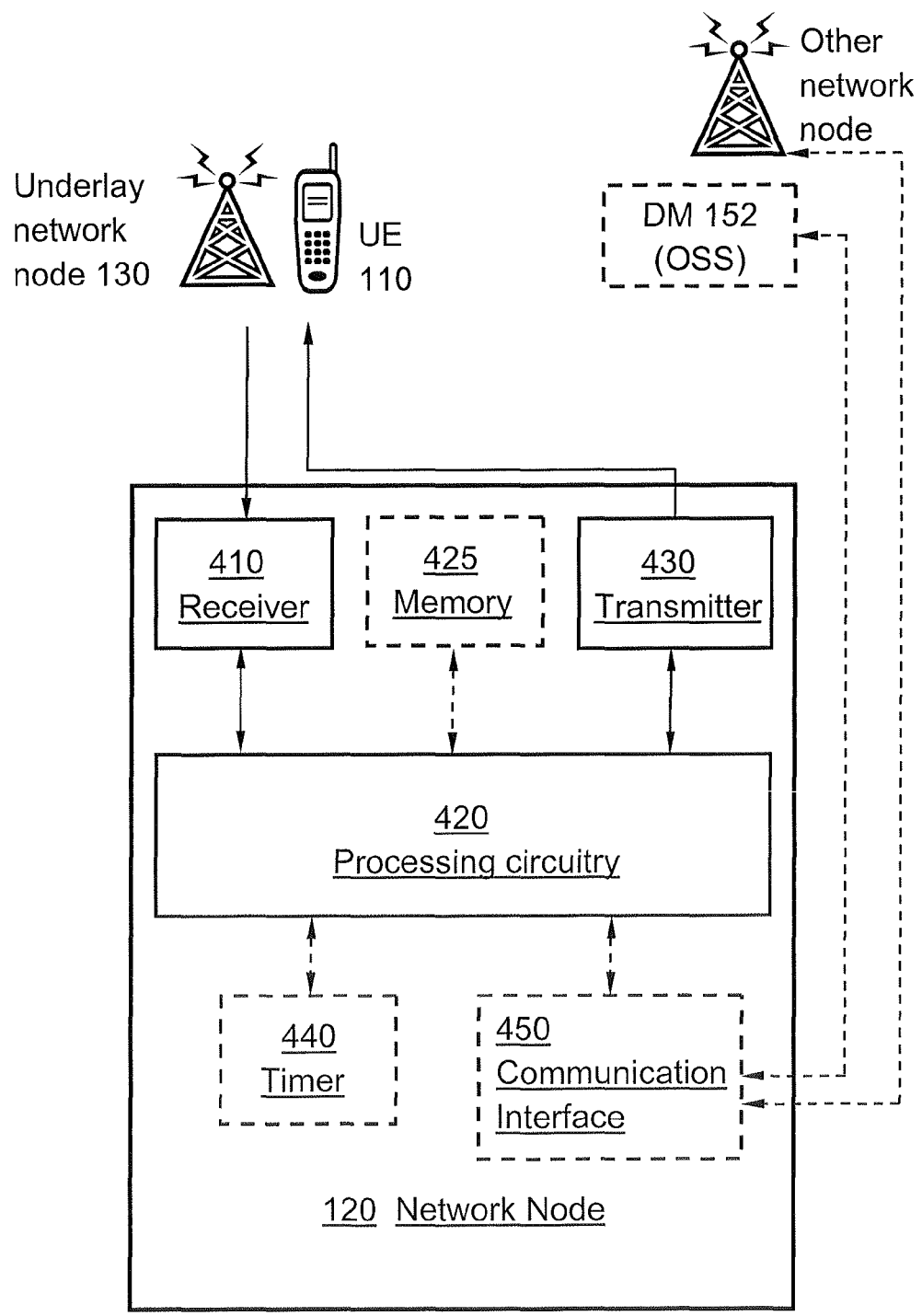
FIG. 4 is a schematic block diagram illustrating an example of an embodiment of a network node.

FIG. 4 is a block diagram illustrating a network node 120, which is serving a user equipment 110. The network node 120 is configured to perform any, some or all of the actions 301-307 for configuring the user equipment 110 to send a measurement report in a wireless communication network 100 comprising the network node 120 and an underlay network node 130. Based on that measurement report, when received by the network node 120, it may be determined if a handover of the user equipment 110 is to be made to the underlay network node 130.

For enhanced clarity, any internal electronics or other components of the network node 120, not completely indispensable for understanding the present method has been omitted from FIG. 4.

The network node 120 comprises a processing circuitry 420, configured to estimate an amount of data the user equipment 110 is expected to communicate. The processing circuitry 420 is also configured to determine that the user equipment 110 is a candidate for hand over to the underlay network node 130, based on the estimated amount of data. In addition, the network node 120 is also configured to instruct the user equipment 110 to send a measurement report.

According to some embodiments, the processing circuitry 420 may also be configured to determine the user equipment 110 to be a candidate for hand over to the underlay network node 130, when the estimated amount of data the user equipment 110 is expected to communicate exceeds a threshold value. The threshold value may be predetermined, or configurable according to different embodiments. Further, the processing circuitry 420 may also be configured to determine an offset value, based on the estimated amount of data the user equipment is expected to communicate.

The processing circuitry 420 may further be configured to instruct the user equipment 110 to send the measurement report by sending the determined offset value to the user equipment 110, according to some embodiments. In addition, the user equipment 110 may be configured to instruct the user equipment 110 to send the measurement report when a first signal radio condition value of a signal received from the network node 120 is exceeded by the offset value, added to a second signal radio condition value of a signal received from the underlay network node 130.

In further addition, the processing circuitry 420 according to some embodiments may be configured to decide, based on the measurement report received from the user equipment 110, to hand over the user equipment 110 to the underlay network node 130. Also, furthermore, the processing circuitry 420 may be configured to hand over the user equipment 110 to the underlay network node 130, according to some embodiments.

The processing circuitry 420 may be configured to decide to hand over the user equipment 110 to the underlay network node 130 by receiving the measurement report received from the user equipment 110, extracting a first signal radio condition value of a signal received from the network node 120 and a second signal radio condition value of a signal received from the underlay network node 130 from the measurement report, adding the determined offset value to the second signal radio condition value, comparing the first signal radio condition value with the second signal radio condition value and the added offset value, and deciding to hand over the user equipment 110 to the underlay network node 130 if the second signal radio condition value and the added offset value exceeds the first signal radio condition value, according to some embodiments.

The processing circuitry 420 may be configured to determine the offset value to be a first value when the user equipment 110 is estimated to communicate a first amount of data. Also, the processing circuitry 420 may be configured to determine the offset value to be a second value when the user equipment 110 is estimated to communicate a second amount of data, wherein the first value is lower than the second value, and the first amount of data is less than the second amount of data.

The first value may be within the interval of 0-3 dB while the second value may be within the interval of 2-10 dB, according to some embodiments.

In some alternative embodiments, the processing circuitry 420 may be configured to determine the offset value to be proportional to the estimated amount of data the user equipment 110 is expected to communicate. Thus the processing circuitry 420 may be configured to determine the offset value to be high if the user equipment 110 is expected to communicate much data and vice versa. Thus, the processing circuitry 420 may be configured to determine more than two alternative values for the offset value, such as e.g. an unlimited amount of such values, comprising also negative values. In the latter case, the result may not be a cell range expansion of the underlay cell, but a cell range contraction, which however may be appropriate in some circumstances such as e.g. load balancing between the network node 120 and the underlay network node 130.

The processing circuitry 420 may be configured to estimate the amount of data the user equipment 110 is expected to communicate, based on a random access preamble received from the user equipment 110 according to some embodiments. The group of preambles from which the received random access preamble may be selected corresponds to the amount of data the user equipment 110 is expected to communicate.

The processing circuitry 420 may additionally be configured to estimate the amount of data the user equipment 110 is expected to communicate, based on a buffer status report received from the user equipment 110, according to some embodiments.

Further, the processing circuitry 420 may according to some embodiments be configured to estimate the amount of data the user equipment 110 is expected to communicate, based on a power headroom report, received from the user equipment 110.

Also, the processing circuitry 420 may alternatively be configured to start a timer 440, according to some embodiments, at a point in time after the user equipment 110 has been determined to be in connected mode. Furthermore, the processing circuitry 420 may also be configured to determine the offset value to the second value when the user equipment 110 still is in connected mode when the timer 440 times out. The run time of the timer may be predetermined.

Additionally, the processing circuitry 420 may be configured to estimate the amount of data the user equipment 110 is expected to communicate by comparing the data to be transmitted in the downlink to the user equipment 110 with a downlink data threshold value, according to some embodiments.

The processing circuitry 420 may be configured to estimate the amount of data the user equipment 110 is expected to communicate by analysing the category of data the user equipment 110 is communicating, according to some embodiments.

Also, the processing circuitry 420 may be configured to estimate the amount of data the user equipment 110 is expected to communicate by analysing the capability of the user equipment 110, according to some embodiments. Thereby the user equipment 110 having a capability exceeding a threshold value may be expected, or assumed to communicate more data than the user equipment 110 having a capability below the threshold value.

Further, the processing circuitry 420 may be configured to determine the offset value to the first value when the user equipment 110 has experienced a handover failure to, or radio link failure with the underlay network node 130 within a period of time, according to some embodiments.

Additionally, the processing circuitry 420 may in some embodiments be configured to determine the offset value based on whether interference reduction means such as almost blank subframes has been detected or not according to some embodiments. Moreover, the processing circuitry 420 may be configured to determine the offset value based on coverage estimation of the underlay cell, which may be based on estimated radio signal quality if being served by the underlay network node 130, considering the interference reduction means in the network node 120 in some embodiments.

The processing circuitry 420 may in addition be configured to estimate, based on the measurement report received from the user equipment 110, that the user equipment 110 is to be handed over to the underlay network node 130. Also, furthermore, the processing circuitry 420 may in addition be configured to hand over the user equipment 110 to the underlay network node 130.

The processing circuit 420 may comprise e.g. one or more instances of a Central Processing Unit (CPU), a processing unit, a processor, an Application Specific Integrated Circuit (ASIC), a microprocessor, or other processing logic that may interpret and execute instructions. The processing circuit 420 may further perform data processing functions for inputting, outputting, and processing of data comprising data buffering and device control functions, such as call processing control, user interface control, or the like.

The network node 120 may furthermore be configured, according to some embodiments, to maintain statistics associated with the method 300 and/or the actions 301-307. In one embodiment, the network node 120 may maintain counters for number of user equipment 110 determined to be a candidate for hand over to the underlay network node 130, based on the estimated 302 amount of data and number of user equipment 110 not considered to be handover candidates, for example over a monitoring time window. In another embodiment, the network node 120 may maintain counters for number of user equipment 110 determined to be a candidate for hand over to the underlay network node 130, based on the estimated 302 amount of data of the user equipment 110 that also performed a handover attempt, as well as counters for number of user equipment 110 considered to be handover candidates that did not perform a handover attempt. In another embodiment, the network node 120 may maintain counters for number of user equipment 110 determined to be a candidate for hand over to the underlay network node 130, based on the estimated 302 amount of data of the user equipment 110 that also succeeded with the handover attempt, as well as counters for number of user equipment 110 considered to be handover candidates that did not succeed with the handover attempt, according to some different embodiments.

According to embodiments wherein any, some or all of the above mentioned statistics is collected by the network node 120, the network node 120 may be further configured to report the collected statistics to the management system 150. In an LTE configuration, the network node 120 may be configured to forward the collected statistics to the domain manager 152, which may be configured to gather statistics from a plurality of network nodes 120, and possibly perform calculations on the gathered statistics, which in turn may be utilised e.g. for further fine tuning of the offset values, and/or any of the threshold values involved. However, in some embodiments, the domain manager 152 may in turn be configured to forward the statistics to the network manager 151. According to some such embodiments, the network manager 151 may be configured to gather statistics from a plurality of network nodes 120, and possibly perform calculations, which in turn may be utilised e.g. for further fine tuning of the offset values, and/or any of the threshold values involved. Thereby, the management system 150, or any appropriate node comprised within it, such as the domain manager 152 or the network manager 151 may configure certain parameters of the method 300, such as the offset values, and/or any of the threshold values.

The network node 120 may further comprise a receiver 410. The receiver 410 may be configured to receive wireless signals from the user equipment 110, and/or from the underlay network node 130. Further, the receiver 410 may be configured to receive a measurement of received signal strength from the user equipment 110, measured on signals received by the user equipment 110 from the network node 120 and the underlay node 130, respectively, according to some embodiments.

In addition, the network node 120 may further comprise a transmitter 430 according to some embodiments. The transmitter 430 may be arranged to transmit wireless signals to the user equipment 110, and/or the underlay network node 130. The transmitter 430 may according to some embodiments be configured to transmit an instruction to be received by the user equipment 110, instructing the user equipment 110 to not report any signal strength measurements, if they are smaller than a threshold value. Alternatively, the transmitter 430 may be configured to send an instruction, instructing the user equipment 110 to not report any signal strength measurements, if the expected data to be communicated by the user equipment 110 is smaller than a threshold value. Thereby, battery power of the user equipment 110 may be saved. Also, interference over the air interface and processing power resources may be reduced/saved by not signalling redundant data.

According to some embodiments, the network node 120 may further comprise at least one memory 425. The memory 425 may comprise a physical device utilized to store data or programs i.e. sequences of instructions, on a temporary or permanent basis. According to some embodiments, the memory 425 may comprise integrated circuits comprising silicon-based transistors. Further, the memory 425 may be volatile or non-volatile. The network node 110 may further according to some embodiments comprise at least one volatile memory 425 and also at least one non-volatile memory 425.

In addition, the network node 120 may further comprise, according to some embodiments, a timer 440. The timer 440 may be configured to measure the time the user equipment 110 is in connected mode, or at least a minimum time the user equipment 110 is in connected mode. The timer 440 may comprise e.g. a countdown timer, a stop watch timer, a watch dog timer The network node 120 may further according to some embodiments comprise a communication interface 450, configured to communicate over a wired and/or wireless connection with other entities such as e.g. other network nodes, or a management system 150. Any such communication may be made via an X2 or an S1 connection, for example. However, various communication protocols may be utilised according to different embodiments based on e.g. radio access technology.

Further, it is to be noted that some of the described units 410-450 comprised within the network node 120 in the wireless communication system 100 are to be regarded as separate logical entities but not with necessity separate physical entities. To mention just one example, the receiver 410 and the transmitter 430 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 120, the underlay network node 130 and the user equipment 110 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 301-307 to be performed in the network node 120 may be implemented through one or more processing circuits 420 in the network node 120, together with computer program code for performing the functions of the present actions 301-307. Thus a computer program product, comprising instructions for performing the actions 301-307 in the network node 120 may determine to handover the user equipment 110 to an underlay network node 130, when the computer program code is loaded into the one or more processing circuits 420.

The computer program product mentioned above may be provided for instance in the form of a data carrier carrying computer program code for performing at least some of the actions 301-307 according to some embodiments when being loaded into the processing circuit 420. The data carrier may be e.g. a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the user equipment 110 remotely, e.g. over an Internet or an intranet connection.

When using the formulation "comprise" or "comprising" within the present context, it is to be interpreted as non-limiting, i.e. meaning "consist at least of". The present methods and devices are not limited to the above described preferred embodiments. Various alternatives, modifications and equivalents may be used. Therefore, the above embodiments are not to be taken as limiting the scope of claimed protection, which instead is to be defined by the appending claims.

The invention claimed is:

1. A method in a network node, which is serving a user equipment, for instructing the user equipment to send a measurement report in a wireless communication network comprising the network node and an underlay network node, the method comprising:
  estimating an amount of data the user equipment is expected to communicate,
  determining the user equipment to be a candidate for hand over to the underlay network node when the estimated amount of data the user equipment is expected to communicate exceeds a threshold value,
  determining an offset value based on the estimated amount of data, and
  instructing the user equipment to send a measurement report, wherein the instructing comprises sending the determined offset value to the user equipment and instructing the user equipment to send the measurement report when a first signal radio condition value of a signal received from the network node is exceeded by the determined offset value added to a second signal radio condition value of a signal received from the underlay network node.

2. The method according to claim 1, further comprising:
  deciding, based on the measurement report received from the user equipment, to hand over the user equipment to the underlay network node, and
  handing over the user equipment to the underlay network node.

3. The method according to claim 2, wherein:
  the action of deciding to hand over the user equipment to the underlay network node comprises
    receiving the measurement report received from the user equipment,
    extracting the a first signal radio condition value of a signal received from the network node and a second signal radio condition value of a signal received from the underlay network node from the measurement report,
    adding the determined offset value to the second signal radio condition value,
    comparing the first signal radio condition value with the second signal radio condition value and the added offset value, and
    deciding to hand over the user equipment to the underlay network node if the second signal radio condition value and the added offset value exceeds the first signal radio condition value.

4. The method according to claim 1, wherein
  the offset value is determined to be a first value when the user equipment is estimated to communicate a first amount of data and wherein the offset value is determined to be a second value when the user equipment is estimated to communicate a second amount of data, wherein
    the first value is lower than the second value, and
    the first amount of data is less than the second amount of data.

5. The method according to claim 4, further comprising:
  starting a timer at a point in time when the user equipment has been determined to be in connected mode, and
  determining the offset value to be the second value when the user equipment still is in connected mode when the timer times out.

6. The method according to claim 1, wherein the estimation of the amount of data the user equipment is expected to communicate, is based on a random access preamble received from the user equipment, wherein the group of preambles from which the received random access preamble is selected corresponds to the amount of data the user equipment is expected to communicate.

7. The method according to claim 1, wherein the estimation of the amount of data the user equipment is expected to communicate, is based on a buffer status report, received from the user equipment.

8. The method according to claim 1, wherein the estimation of the amount of data the user equipment is expected to communicate, is based on a power headroom report, received from the user equipment.

9. The method according to claim 1, further comprising:
  estimating the amount of data the user equipment is expected to communicate by comparing the data to be transmitted in the downlink to the user equipment with a downlink data threshold value.

10. The method according to claim 1, further comprising:
  estimating the amount of data the user equipment is expected to communicate by analysing the category of data the user equipment is communicating.

11. A network node, configured for instructing a user equipment, served by the network node, to send a measurement report in a wireless communication network comprising the network node and an underlay network node, the network node comprising processing circuitry, the processing circuitry operable to:
  estimate an amount of data the user equipment is expected to communicate,
  determine that the user equipment is a candidate for hand over to the underlay network node when the estimated amount of data the user equipment is expected to communicate exceeds a threshold value,
  determine an offset value based on the estimated amount of data,
  instruct the user equipment to send a measurement report by sending the determined offset value to the user equipment and instructing the user equipment to send the measurement report when a first signal radio condition value of a signal received from the network node is exceeded by the determined offset value added to a second signal radio condition value of a signal received from the underlay network node.

12. The network node according to claim 11, wherein the processing circuitry is further operable to:
  determine whether to hand over the user equipment to the underlay network node based on the measurement report received from the user equipment, and
  hand over the user equipment to the underlay network node.

13. The network node according to claim 12, wherein the processing circuitry is further operable to:

decide to hand over the user equipment to the underlay network node by receiving the measurement report received from the user equipment, extracting the first signal radio condition value of the signal received from the network node and the second signal radio condition value of the signal received from the underlay network node from the measurement report, adding the determined offset value to the second signal radio condition value, comparing the first signal radio condition value with the second signal radio condition value and the added offset value, and deciding to hand over the user equipment to the underlay network node if the second signal radio condition value and the added offset value exceeds the first signal radio condition value.

14. The network node according to claim 11, wherein the processing circuitry is further operable to determine the offset value to be a first value when the user equipment is estimated to communicate a first amount of data and to determine the offset value to be a second value when the user equipment is estimated to communicate a second amount of data, wherein the first value is lower than the second value, and the first amount of data is less than the second amount of data.

15. The network node according to claim 14, wherein the processing circuitry is further operable to:
start a timer at a point in time after the user equipment has been determined to be in connected mode, and
determine the offset value to be the second value when the user equipment still is in connected mode when the timer times out.

16. The network node according to claim 11, wherein the processing circuitry is further operable to estimate the amount of data the user equipment is expected to communicate, based on a random access preamble received from the user equipment , wherein the group of preambles from which the received random access preamble is selected corresponds to the amount of data the user equipment is expected to communicate.

17. The network node according to claim 11, wherein the processing circuitry is further operable to estimate the amount of data the user equipment is expected to communicate, based on a buffer status report received from the user equipment.

18. The network node according to claim 11, wherein
the processing circuitry is further operable to estimate the amount of data the user equipment is expected to communicate, based on a power headroom report, received from the user equipment.

19. The network node according to claim 11, wherein the processing circuitry is further operable to estimate the amount of data the user equipment is expected to communicate by comparing the data to be transmitted in the downlink to the user equipment with a downlink data threshold value.

20. The network node according to claim 11, wherein the processing circuitry is further operable to estimate the amount of data the user equipment is expected to communicate by analysing the category of data the user equipment is communicating.

21. The network node according to claim 11, wherein the processing circuitry is further operable to:
estimate, based on the measurement report received from the user equipment, that the user equipment is to be handed over to the underlay network node, and
hand over the user equipment to the underlay network node.

* * * * *